May 3, 1960  A. JOLY  2,935,138
FEELER-CONTROLLED LATERALLY SHIFTABLE PLOW
Filed April 23, 1956
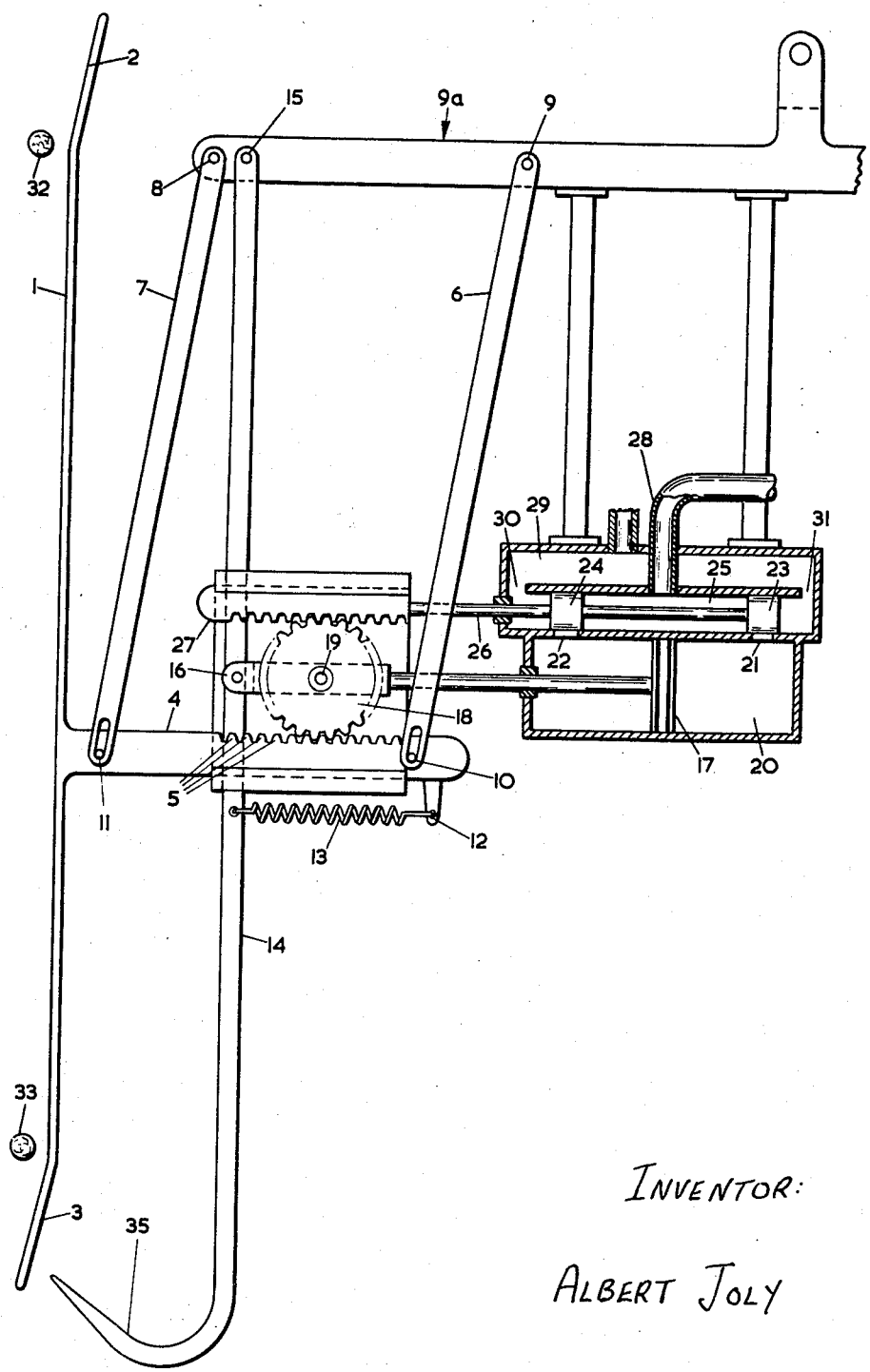
INVENTOR:
ALBERT JOLY

United States Patent Office 2,935,138
Patented May 3, 1960

2,935,138

FEELER-CONTROLLED LATERALLY SHIFTABLE PLOW

Albert Joly, Berre l'Etang, France

Application April 23, 1956, Serial No. 580,141

Claims priority, application France April 26, 1955

1 Claim. (Cl. 172—5)

The working of certain soils or crops requires particular care in order to avoid the plough share or tool carrier tearing up the vegetables which it is desired to grow. Very often the cultivator must work by hand the strip of earth which is left by the vine-grower's plough along the line of the plough. If this hoeing of the remaining strip of earth is effected mechanically, it is necessary again to guide the plough by hand, which causes considerable fatigue and is a considerable amount of work.

The object of the present invention is to provide a laterally shiftable plow which is controlled by a feeler which contacts the trunks of the individual vines and causes the plow to avoid the vines whilst working substantially the whole of the length of soil between adjacent vines.

An embodiment of automatic plough in accordance with the invention is hereinafter particularly described with reference to the accompanying diagrammatic drawing.

This drawing is a plan view showing diagrammatically the tool on a tool-carrying arm, a feeler bar to contact the crops to be avoided by the tool, a hydraulic motor for lateral shifting of the tool-carrying arm, and valve means on said motor operable by the feeler bar.

The apparatus is constituted by a feeler bar 1 having at its forward end, in the direction of travel, a lead-in contact surface 2 to abut against growing crops, and at its other end a lead-out deflector 3. This feeler bar is supported by a shaft 4 carrying a rack 5, and forming part of a parallelogram with parallelling arms 6, 7 pivoting at axes 8, 9 on a frame element 9a of the plough. 10 and 11 are pivot joints between the shaft 4 and arms 6, 7.

The shaft 4 is provided with an extension 12 coupled by a spring 13 which tends to keep the feeler bar at a predetermined separation from the tool arm. The tool carrying arm 14 is pivotable in a horizontal plane about a fixed axis 15 on the frame. The tool arm is also coupled to rod 16 of a piston 17 and carries a toothed wheel 18 freely rotatable on shaft 19.

The piston 17 is part of a double action hydraulic jack having a cylinder 20 provided with two valves holes 21, 22 closed by twin slide valves 23, 24 sliding in a valve chamber 25 and mounted on a rod 26 comprising a rack 27 meshing on the wheel 18. This valve chamber communicates with a conduit 28 for supply of fluid under pressure, and also with a reservoir 29, through holes 30 and 31, for exhaust of said fluid from the jack cylinder.

The operation is as follows:

The apparatus is mounted on a plough frame and an identical apparatus may be provided on each side of the frame where two ploughs are to be used.

The feeler bar 1 contacts the stalks 32, 33 of the growing crops and as a result moves to the right in the drawing.

The shaft 4 guided by the arms 6, 7 moves and the rack 5 causes a rotation, anticlockwise, of the wheel 16. This draws the rod 26 to the left in the drawing, so that the valve members 23, 24 are moved to uncover the holes 21 and 22.

The fluid under pressure enters the double-action jack 20 and moves the piston 17 to the right, at the same time as the fluid contained in the right hand part of the cylinder part is moved, through the hole 21 into the exhaust reservoir 24.

The valve members 23, 24 assure immediate passage of fluid to the piston in such a manner that there is no dead period. The control is direct, rapid and precise because of this immediate supply of fluid under pressure to the piston.

Under the effect of this pressure on the piston, the rod 16 is drawn to the right and the plough share 35 following the movement passes by the stalks 33 without risking contacting them.

During this movement of the plough, the movement of its axis 19 causes a rotation clockwise of the wheel 18, and as a result returns the valve members 23, 24 to the dead point. This immobilises the tool carrier 14 in the position determined by the feeler bar.

The length of the feeler bar 1 is such that it always contacts a stalk and the lead-in portion 2 permits it to accommodate irregularities of planting or misshapen plants.

The return of the plough to normal position to the left is obtained by evacuation of fluid under pressure from the reservoir when the holes 21, 31 are uncovered.

The plough can thus be operated between rows of crops, and will automatically avoid said crops.

I claim:

In an automatic plow, a frame for the plow, a tool-carrying arm mounted on the frame by a vertical pivot at one end and carrying the ground-working tool at the other end, a cylinder of a double-action hydraulic piston and cylinder device mounted on the frame and having adjacent each end a valve opening serving both for inlet and exhaust, a piston in said cylinder having a rod coupled intermediately along the tool arm for lateral movement of the tool by movement of the piston in the cylinder, a slide valve chamber mounted directly on the cylinder and covering the valve openings of the cylinder, an inlet and an outlet for pressure fluid in said chamber, a slide valve movable in said chamber and arranged to simultaneously open or close both said valve openings of the cylinder so as to place one in communication with the pressure fluid inlet and the other in communication with the outlet, a feeler bar for contacting crops mounted on the frame at a position projecting laterally of the frame and capable of movement transversely of the frame in a horizontal plane, a toothed wheel mounted on the piston rod and freely rotatable with respect thereto, a first rack meshed with said toothed wheel and coupled to the feeler bar, a second rack meshed with said toothed wheel and coupled to the slide valve, and spring means coupling the feeler bar to the tool arm to urge said bar into a predetermined separation horizontally from said arm, the arrangement of the racks, toothed wheel, and slide valve being such that lateral movements of the feeler bar due to striking crops are followed instantaneously by the tool arm under the action of the hydraulic piston and cylinder device.

References Cited in the file of this patent

UNITED STATES PATENTS

| 900,981 | Chilson | Oct. 13, 1908 |
| 1,119,324 | Sprater | Dec. 1, 1914 |
| 2,442,095 | Reed | May 25, 1948 |
| 2,608,146 | Lund | Aug. 26, 1952 |
| 2,749,824 | Friday | June 12, 1956 |

FOREIGN PATENTS

| 648,383 | France | Aug. 13, 1928 |
| 911,779 | France | Apr. 1, 1946 |
| 991,829 | France | June 27, 1951 |
| 1,097,099 | France | Feb. 9, 1955 |